United States Patent [19]

Sloan et al.

[11] 4,107,817
[45] Aug. 22, 1978

[54] SWIVEL ASSEMBLY

[75] Inventors: James L. Sloan, Avon; Greg W. Meeker, Rochester, both of N.Y.

[73] Assignee: Cross River Products, Inc., Rochester, N.Y.

[21] Appl. No.: 754,556

[22] Filed: Dec. 27, 1976

[51] Int. Cl.[2] .............................................. B60B 33/00
[52] U.S. Cl. ........................................................ 16/20
[58] Field of Search ...................................... 16/20–22, 16/35 R, 46, 18 R, 31 R, 45, 47, 48, 29, 30, 38, 39; 280/79.1 R

[56] References Cited

U.S. PATENT DOCUMENTS

| 1,181,631 | 5/1916 | Baum ....................................... 16/22 |
| 1,408,266 | 2/1922 | Campbell ................................ 16/21 |
| 2,847,696 | 8/1958 | Kramcsak, Jr. ......................... 16/20 |
| 2,891,273 | 6/1959 | Hutchinson ............................. 16/20 |

FOREIGN PATENT DOCUMENTS

| 2,334,324 | 1/1975 | Fed. Rep. of Germany .......... 16/35 R |
| 20,834 of | 1907 | United Kingdom ..................... 16/31 R |
| 353,173 | 7/1931 | United Kingdom ......................... 16/21 |
| 707,237 | 4/1954 | United Kingdom ......................... 16/21 |

Primary Examiner—Dorsey Newton
Attorney, Agent, or Firm—Cumpston & Shaw

[57] ABSTRACT

An improved swivel assembly for a shopping cart, stroller or the like. The swivel assembly comprises a yoke having a vertically extending opening therethrough into which an end of a cart leg or the like is journaled for rotation of the swivel assembly around the leg. The yoke further has a horizontal opening laterally spaced from the vertical opening for supporting a shaft on which one or more wheels are mounted for rotation. A collar is rigidly secured to the shaft for preventing disengagement of the cart leg from the yoke.

4 Claims, 2 Drawing Figures

SWIVEL ASSEMBLY

BACKGROUND OF THE INVENTION

1. Field of the Invention

This invention relates generally to swivel mechanisms, and more specifically to an improved swivel assembly.

2. Description of the Prior Art

Swivel assemblies for carts, strollers and the like are generally well known in the art. One well known swivel assembly is the caster and comprises an arcuate bifurcated member for supporting an axle at one end upon which a wheel is mounted for rotation. A flat flange is provided at the opposite end of the member to which a vertically extending stub shaft is secured. The stub shaft extends into a sleeve in a leg of the cart, and a detent between the sleeve and stub shaft releasably secures the caster to the leg.

Another known swivel assembly comprises a pair of spaced apart plates having aligned openings at one end for supporting a shaft on which a pair of wheels are rotatably mounted. A hinge pin is provided at the opposite ends of the plates for hingeably supporting the end of a stub shaft interposed between the plates. A bracket and sleeve bearing is rotatably mounted on the stub shaft and has bifurcated arms secured to the end of a cart leg by rivets or the like. A cylindrical rubber shock absorber is secured between the plates for engagement by the stub shaft.

Although these prior known swivel assemblies operate satisfactorily, each requires a stub shaft rotatable relative to the cart leg and related structure for securing the stub shaft to the swivel assembly. Consequently, such swivel assemblies suffer from the disadvantage of requiring a considerable number of individual interacting parts. This in turn makes the swivel assemblies more expensive to manufacture and assemble, more prone to require maintenance and less reliable in operation. In the case of the latter type swivel assembly, the stub shaft is susceptible to bending and the sleeve bearing to breaking if the swivel assembly is subjected to a hard blow. The improved swivel assembly of this invention is believed to obviate these and other disadvantages of the prior known swivel assemblies.

SUMMARY OF THE INVENTION

In accordance with a preferred embodiment of the invention, an improved swivel assembly of simple design and construction for objects such as a shopping cart, stroller or the like is disclosed. The swivel assembly comprises a yoke having a vertically extending opening therethrough into which an end of a cart leg is journaled for rotation of the yoke around the leg. The yoke further has a horizontally extending opening laterally spaced from the vertical opening for rotatably supporting a shaft on which at least one front wheel is mounted. Abutment means such as a collar per se or a collar in combination with a sleeve is provided on the cart leg. The collar cooperates with the yoke to prevent disengagement of the cart leg from the yoke while allowing rotation of the yoke around the cart leg. The collar per se or in combination with a rim on the sleeve further transmits the weight of the cart to a load bearing surface or surfaces of the yoke.

In a more specific modification of the invention, the yoke has a notch intermediate its ends which is transverse to and extends across the vertical opening for receiving the collar. The collar is provided with an outer diameter greater than the diameter of the vertical opening. Accordingly, when the collar is secured to the leg it is captured within the notch of the yoke and prevents disengagement of the leg from the yoke and assists in transmitting load to the yoke.

In a further modification of the invention, a sleeve bearing is interposed between the outer periphery of the leg and the periphery of the vertical opening. The collar encircles the sleeve and is rigidly secured along with the sleeve to the cart leg. The sleeve minimizes, for example, the friction between the rotatable yoke and the fixed cart leg, sleeve and collar. The sleeve is further provided with a rim at one end engageable with one end of the yoke for increasing the load supporting surface area of the yoke.

The primary advantages, among others, of the improved swivel assembly of this invention are its simplicity of design and construction, its ruggedness, and its economy of manufacture and assembly.

The invention and these and other advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
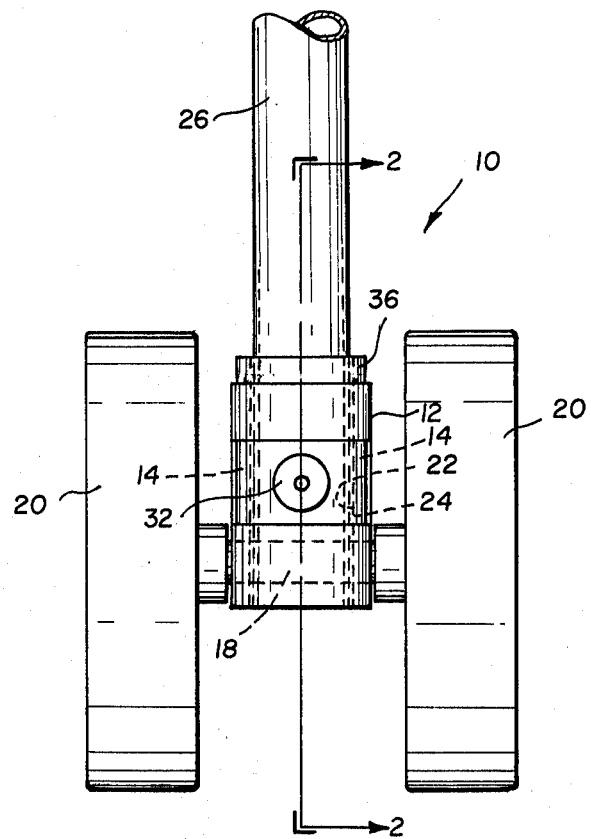
FIG. 1 is a front elevational view of a preferred embodiment of the swivel assembly of this invention secured to a leg of an object such as a cart.
Figure 2:
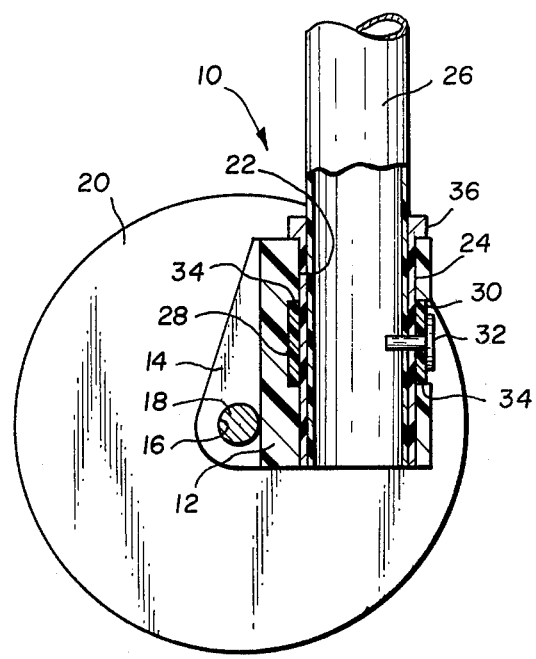
FIG. 2 is a section view taken substantially along line 2—2 of FIG. 1 with a wheel omitted for purposes of clarity.

With reference to FIGS. 1 and 2, a preferred embodiment of the improved swivel assembly 10 of this invention is disclosed comprising a yoke 12 preferably formed from a thermoplastic material such as nylon or the like. The yoke 12 has a pair of spaced apart parallel flanges 14 having aligned horizontal openings 16 for supporting a stub shaft 18 onto which a pair of wheels 20 are rotatably mounted and secured by any suitable means, not shown. The yoke 12 further has a vertical opening 22 laterally spaced from horizontal openings 16 and extending completely through yoke 12. A sleeve bearing 24 preferably of a thermoplastic material such as nylon or the like encircles the lower end of a leg 26 of an object such as cart or stroller, and the sleeve and leg as a unit are inserted into vertical opening 22 of yoke 12. Yoke 12 is provided with a notch 28 transverse to and extending across vertical opening 22. Abutment means comprising a collar 30 nests in notch 28 and encircles sleeve 24 and is rigidly secured to the sleeve and cart leg 26 by a rivet 32 or the like to form a stationary unit around which yoke 12 is free to rotate. The outside diameter of collar 30 is greater than the inner diameter of vertical opening 22 so that the ends of collar 30 engage corresponding shoulders 34 defining notch 28 to prevent axial disengagement of cart leg 26 from yoke 12 while allowing rotation of yoke 12 around sleeve 24, leg 26 and collar 30 as a unit. The lower end of collar 30 further serves to transmit the load of the cart to shoulder 34 of the yoke. The sleeve 24 minimizes the friction between yoke 12 and the stationary sleeve and leg. The abutment means can also comprise an upper rim 36 on sleeve 24 adapted to engage the upper surface of yoke 12 for transmitting the load or weight of the cart to the yoke.

It, of course, should be understood that the abutment means can assume other forms and should not be limited to a collar with or without a sleeve rim. For example, the abutment means could be at least one pin secured to the cart leg and having its radially extending end rotatable within an annular groove in the yoke. Another possibility could be a pair of spaced apart abutments secured to or integral with the cart leg, one engaging the top surface of the yoke and the other engaging the bottom surface of the yoke.

The invention has been described in detail with particular reference to a preferred embodiment, but it will be understood that variations and modifications can be effected within the spirit and scope of the invention as described hereinabove.

What is claimed is:

1. An improved swivel assembly rotatably mounted on a stationary leg of a cart or the like comprising:
   a yoke having at least one load bearing shoulder, a vertically extending first opening for receiving a leg journaled therein about which said yoke rotates, and a horizontally extending second opening laterally spaced from said first opening for rotatably supporting the shaft of a wheel;
   abutment means encircling the leg with a portion of said abutment means positioned adjacent said load bearing shoulder; and
   means for rigidly securing said abutment means to the leg whereby said portion of said abutment means cooperates with said shoulder for preventing disengagement of the leg from said yoke and for transmitting the load of the cart to said yoke.

2. The swivel assembly of claim 1 wherein said abutment means comprises a collar rigidly secured to the leg by said securing means, and said yoke has a notch intermediate its ends forming a pair of spaced shoulders, said notch being transverse to and extending across said first opening for receiving said collar, said collar has end surfaces and an outer diameter greater than the diameter of said first opening whereby said collar is captured within said notch and said end surfaces of said collar cooperate with said shoulders for preventing disengagement of the leg from said yoke and for transmitting the load of the cart to said yoke.

3. The swivel assembly of claim 2 wherein said abutment means further comprises a sleeve bearing interposed between the leg and the periphery of said first opening, and said collar encircles said sleeve and is rigidly secured to said sleeve and to the leg by said securing means.

4. The swivel assembly of claim 3 wherein said sleeve is provided with a rim engageable with one end of said yoke for transmitting some of the load of the cart to said yoke.

* * * * *